United States Patent [19]

Hopkins

[11] Patent Number: 4,565,402
[45] Date of Patent: Jan. 21, 1986

[54] TRUCK BED SUPPORT FRAME UNIT

[76] Inventor: David B. Hopkins, R.R. 8, Box 90, Frankfort, Ind. 46041

[21] Appl. No.: 545,836

[22] Filed: Oct. 27, 1983

[51] Int. Cl.⁴ .............................................. B60P 3/00
[52] U.S. Cl. ................................ 296/3; 224/42.45 R; 211/182
[58] Field of Search ........................ 296/3, 37 R, 102; 224/42.42 R, 42.45 R; 211/182, 189

[56] References Cited

U.S. PATENT DOCUMENTS

| | | | |
|---|---|---|---|
| 1,671,848 | 5/1928 | Wallace et al. | 296/3 |
| 3,622,177 | 11/1971 | Notestine | 296/102 |
| 3,891,262 | 6/1975 | Bunel | 296/3 |
| 4,057,281 | 11/1977 | Garrett | 296/3 |
| 4,152,020 | 5/1979 | Brown et al. | 296/3 |

Primary Examiner—Robert R. Song
Attorney, Agent, or Firm—Robert A. Spray

[57] ABSTRACT

Units of a support frame for a truck bed, providing for each side end of each unit a mounting base permanently attachable to the truck bed, and which provide sturdy support of the upstanding frame components, providing ease of assembly and disassembly once the mounting base is installed. Great stability is provided, fore-and-aft by a fore-and-aft brace member, and transversely of the truck bed by a transverse frame bar which rigidly interconnects the unit-portions adjacent each side of the truck bed.

9 Claims, 11 Drawing Figures

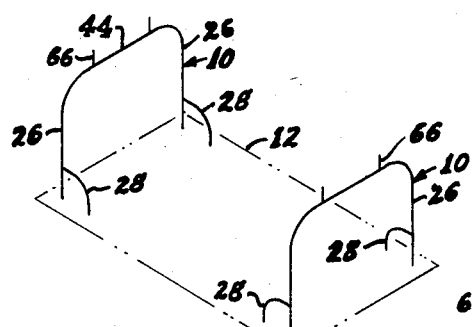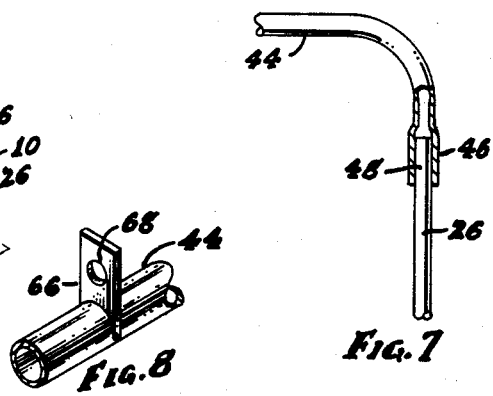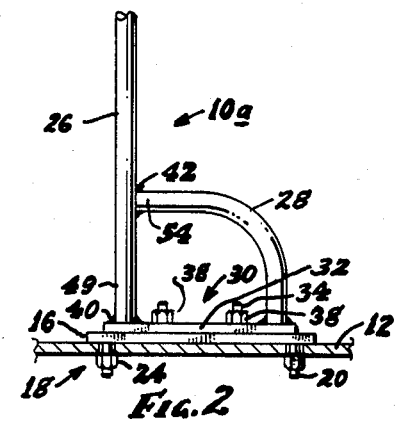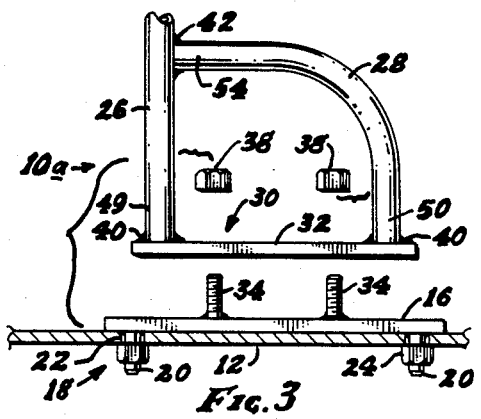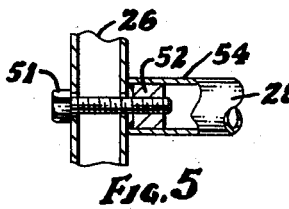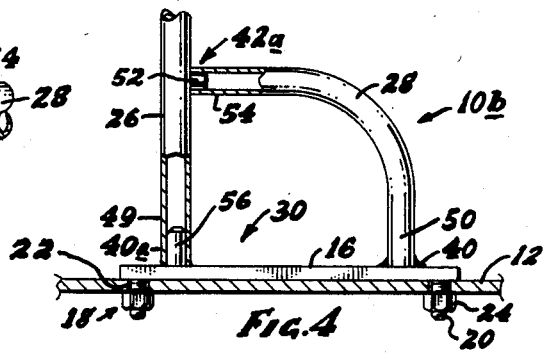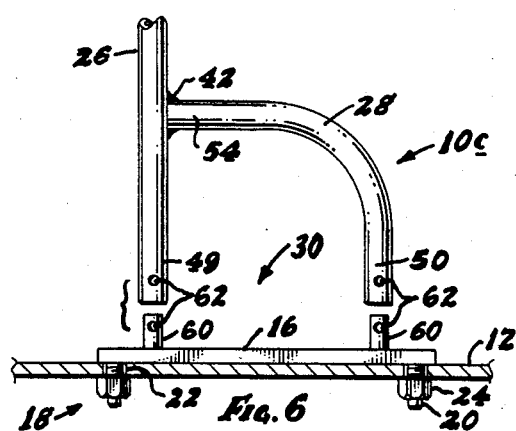

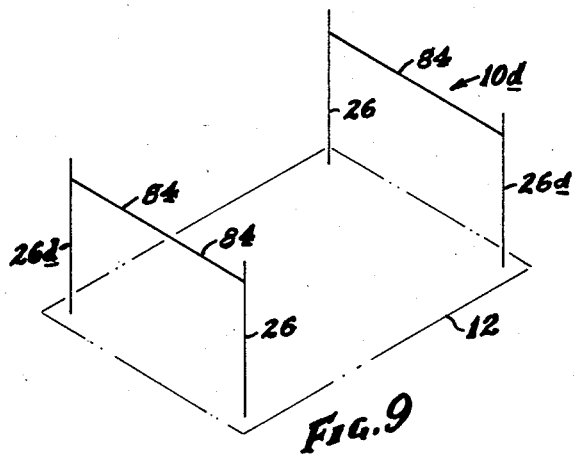
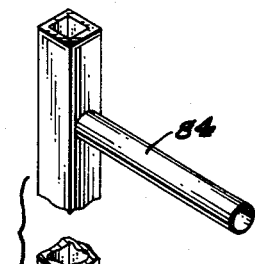
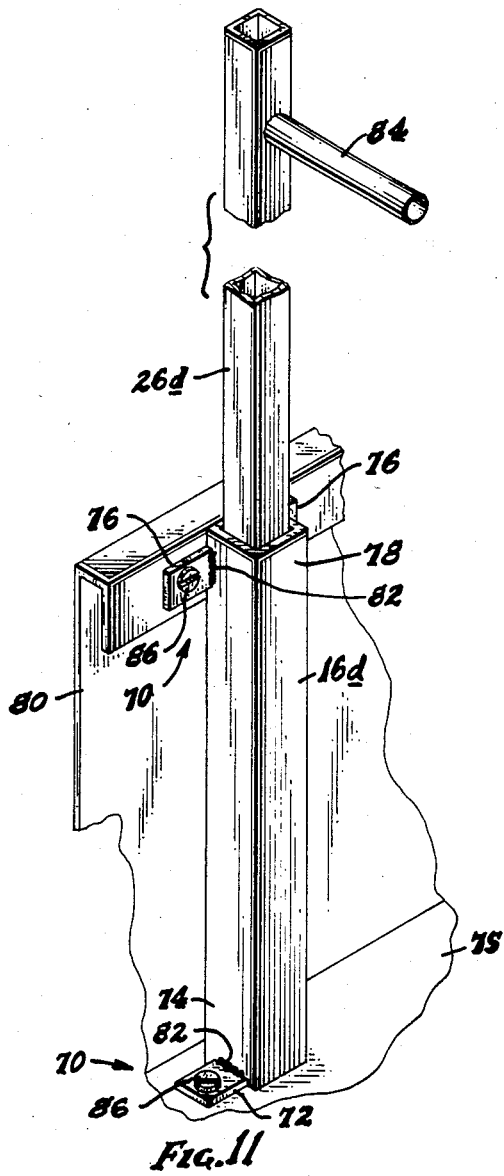
FIG. 9
FIG. 10
FIG. 11

TRUCK BED SUPPORT FRAME UNIT

The present invention relates to a support structure for installation on a truck bed to provide advantages such as the carry of objects at an elevated position. Such advantages have long been provided by many trucks of the prior art by stake pockets, into which are releasably placed upstanding stakes; and the stakes provide easily installable but easily removable supports extending above the truck bed.

Many trucks, however, are not provided with stake pockets; and with many commonly-used small pick-up trucks it seems that stake pockets are not available as an accessory, either as original equipment or as an alteration.

Thus the present invention relates more particularly to a support structure probably mostly useful as an accessory for trucks, such as small pick-up trucks, which are not equipped with stake pockets; although even trucks with stake pockets may be desirably provided with support structures according to the present invention, for some advantages are provided over stakes and stake pockets.

The concepts of the present invention provide and achieve a support frame structure with preferably at least two units, each of which extends transversely of the truck bed, and two or more units are spaced fore-and-aft to provide the amount of elevated support longitudinally of the truck bed as may be desired.

Further, the concepts provide both transverse stability and fore-and-aft stability of each of the units.

Still further, and particularly significant as to many uses, the inventive concepts provide for such high sturdiness even though the structure is quite quick and convenient with respect to assembly onto the truck, and dis-assembly therefrom when not needed, and even though the components are storable in a relatively small container; and particular characteristics of the inventive concepts include the provision that the structure of each of the transversely-spaced sets of each structure unit is provided with a mounting base which, when once installed onto the truck bed, provides the truck even-after with mounting means which provide the ease of attachment or dis-assembly mentioned above, and include the provision of easy assembly and dis-assembly with all pieces rather small, light in weight, and easily handled and packaged.

Moreover, the concepts provide that each of the units of the overall framework may be easily assembled as individual sets, and conversely disassembled, all by a single workman; yet they are not unattractive, and they do not prevent other use of the truck, whether or not they are removed when their special support characteristics are not needed.

Accordingly, the present invention provides support units of an overall truck bed framework, with each embodiment providing a mounting base means permanently attachable to the truck bed; and it provides ease and convenience of solution to a long-standing problem of trucks not having other support means. It is desirable from the standpoint of ease of installation and removal of units of the framework thereafter by attachment then to the mounting bases, is economical, is generally maintenance-free, is easy and convenient to handle and store, etc.

The above description is of somewhat introductory and generalized form. More particular details, concepts, and features are set forth in the following and more detailed description of illustrative embodiments, taken in conjunction with the accompanying drawings, which are of somewhat schematic or diagrammatic nature, and in which:

FIG. 1 is a schematic pictorial illustration of a truck bed having installed thereon two support units according to an embodiment of the present invention, those two support units cooperating to provide a support frame-work of an effective length substantially that of the fore-and-aft length of the truck bed, and substantially as wide as the width of the truck bed;

FIG. 2 is a detail elevation view of the lower portion of a support unit according to a first embodiment of the invention, the support unit being shown as mounted on a truck bed;

FIG. 3 in slightly larger scale, is a similar elevation detail view of the lower portion of the support unit shown in FIG. 1, although in the nature of an exploded view, this shown with a portion of the support unit as connected to the truck bed;

FIG. 4 illustrates a support unit of a second embodiment, this being a detail elevation view of the lower portion of the support unit, and showing it mounted on a truck bed;

FIG. 5 is a detail enlarged view, portions being in vertical cross-section, of a portion of the support unit shown in FIG. 4;

FIG. 6 is a similar elevation detail view of a support unit of a third embodiment, the view being of exploded view nature, and showing the support unit connected to the truck bed;

FIG. 7 is a detail elevation view, partially in cross-section, and in slightly smaller scale, illustrating for all three embodiments of the support unit, the connection of one of the upright support columns with a transverse connection tube;

FIG. 8, in larger scale, is a fragmental pictorial view of a portion of the transverse tube shown in FIG. 7, and showing as provided with an upright connector lug;

FIG. 9 is a schematic pictorial illustration, similar to FIG. 1, of a truck bed having installed thereon two support units according to another embodiment of the invention;

FIG. 10 is a pictorial representation of the lower portion of the embodiment of FIG. 9, illustrating a mounting base of each side of each of the support units, of a type used at the front of the truck bed with a truck bed which includes an end panel or at least a short portion thereof, and with a removable support column shown installed in the mounting base; and FIG. 11 is a pictorial representation similar to FIG. 10, but showing an embodiment of a mounting base used at a location along the truck's side panel, or at the rear of a truck bed having no rear end panel.

As shown in the drawings, the inventive concepts provide what might be referred to as a support unit 10 for an overall support framework for a vehicle such as an open-bed truck or van. Two such units 10 are schematically shown in FIG. 1, as installed onto a truck bed 12, for use such as for providing for the carrying of objects in a supported manner above the truck bed 12.

With a truck which is not provided with stake pockets for supporting stake members for facilitating the elevated carry of such objects, the elevated carrying of objects in a sturdy manner has been a problem nicely solved by this invention; and the overall support framework or frame means will comprise one or more of the support units 10, depending upon whatever is the amount and/or length of fore-and-aft support desired for the truck and for the loading situations for which the truckbed is used.

Thus it is each of the plurality of individual support units 10 (of various embodiments) which is here described and considered; for all the support units of any truck's installation may be quite identical, although several embodiments are shown.

The embodiment 10a as shown in FIGS. 2 and 3 will be first described. It includes a pair of mounting base means 16, one for each side of the truck; and what may be herein referred to as first connection means 18 is provided for rigidly connecting each of the mounting base means 16 to the truck bed 12. Desirably, each respective one of the mounting base means 16 is mounted closely adjacent a side of the truck bed; and as shown, the first connection means 18 includes simply a pair of bolts 20, downwardly extending from the base means 16 through holes 22 in the truck bed 12, with nuts 24. Once fastened, it is contemplated that the two base means 16 would remain permanently affixed to the truck bed 12.

The unit 10a also provides a pair of support column means 26, shown as vertically upright tubes, and a pair of brace means 28; and, for rigidly connecting an associated one of the support column means 26 and brace means 28 to a respective one of the mounting base means 16, there is provided what may be referred to as a second connection means 30, here shown as a plate 32, and bolts 34 extend upwardly from the respective base means 16, passing upwardly through holes (not shown) in plate 32, the connection being made tight by nuts 38. The second connection means 30 in this embodiment also is shown as including welds 40 welding each of the support column means 26 and brace means 28 to the plate means 32.

In this embodiment of support unit 10a, there is also provided what may be referred to as a third connection means 42 (here shown as a weld) for rigidly interconnecting one of the brace means 28 to a respective one of the support column means 26 at a position above its bottom; and thus the unit 10a is a rigid structure, at each side of the truck bed 12, of a vertical support column 26, brace 28, and plate 32.

Upwardly of the support column 26, there is what is referred to herein as a fourth connection means 44, for rigidly interconnecting the two support column means 26 at a high elevation thereof; and this fourth connection means 44 is shown as a generally horizontal frame tube or bar which extends transversely of the truck bed 12 and desirably is flared at its ends 46, each of which are telescoped down onto the upper end 48 of the respective post 26.

Sturdy and rigid fore-and-aft stability to the support unit 10a is thus provided by associated ones of the first connection means 18, the second connection means 30, and the third connection means 42, and the associated one of the brace means 28, all co-operating; and the brace means 28 extends in a generally fore-and-aft direction when assembled onto the mounting base means 16, and the mounting base means 16 itself has been installed onto the truck bed 12.

Moreover, sturdy and rigid transverse stability to the support unit 10a is provided by the associated ones of each unit's sets first connection means 18, second connection means 30, and the fourth connection means 44, and associated support columns means 26 all co-operating together and with those of the other set of the unit.

It will be noted that the second connection means 30 for each associated set of mounting base means 16 support column means 26, and brace means 28 comprises the plate 32 as a secondary base member connected to the lower portion 49 of the support column means 26 and the lower portion 50 of the brace means 28, and also releasable means in the form of bolts 34 and nuts 38 which interconnect the secondary base member or plate 32 to the mounting base means 16.

Further as to the embodiment of individual units 10a, the support column means 26, the brace means 28, and the secondary base member or plate 32 of each set are rigidly connected into a unitary sub-unit; and when two or more such units are provided, the overall framework is exceedingly sturdy.

Further, the invention is seen to provide a permanently fixed mounting plate 16, which provides for easy and convenient assembly and disassembly of the support units 10a by conveniently-accessible releasable means (bolts 34 and nuts 38) which are both easily reachable above the truck bed 12. In other words, the connection of each of the mounting base means 16 to the truck bed 12 by the first connection means 18 provides that each mounting base means 16 provides a mounting means, which is itself permanently affixable to the truck bed 12, which provides support for the respective support column means 26 independent of any connection of the support column means 26 itself to the truck bed, greatly facilitating the easy and convenient erection and removal of the support units 10 to or from the truck.

The mounting plate 16 poses no bother whatever to use of the truck when desired for a use in which the units 10a are removed; and when removed from the fixed mounting plate 16, the unit 10a is easily itself disassembled into individual pieces which may be stored quite compactly.

In the embodiment of units 10b (FIGS. 4 and 5) it will be noted that the second connection means 30 includes the third connection means 42a; for the connection of the support column means 26 and the respective mounting base means 16 is partly through the associated brace means 28 and its connection 40 to the mounting base means 16, and partly by a releasable connection 40a to the mounting base means 16 at the bottom portion 49 of the support column means 26. In this embodiment of support units 10b, the third connection means 42a is shown (FIG. 5) as being a releasable connection, here shown as a bolt 51 passing through the upright column 26 threadedly engaging a nut 52 outwardly facing in the upper end 54 of the brace 28.

This unit 10b (of FIGS. 4 and 5) provides that in dis-assembly of the support unit 10b from the truck bed 12, the only component remaining installed onto the truck bed 12 above the mounting base means 16 is the brace means 28 which is of minimal bother to use of the truck in view of its factors of being fore-and-aft in extent and located adjacent a side of the truck bed 12.

There is no base plate 32 in this embodiment; and the connection of the bottom portion 49 of the upright post 26 is shown by the fitting of that post-portion 49 of the hollow tubular post 26 down over a lug or stud 56 upstanding from the base plate 16. Although this is a quickly releasable connection, it is amply sturdy, considering the screw connection 51–52 and the weld 40.

The embodiment of support unit 10c is quite similar to each of the other embodiments 10a and 10b. That is, the support unit 10c (FIG. 6) is shown as a mounting base 16 with first connection means 18 for attachment to the truck bed 12. However, in this support unit 10c the portion of the second connector means 30, which interconnects each of the support column means 26 and the brace means 28 with the mounting base means 16, includes a lug means 60 upstanding from the mounting base means 16; and the adjacent portion (respectively 49 and 50) of each of the support column means 26 and the brace means 28 is a hollow tubular component which supportingly receives the lug means 60. A pin (not shown) is desirably used to make the connection secure even though releasable; and thus holes 62 are shown in the corresponding parts of post-bottom 49 and brace-bottom 50, as well as in each of the lugs or studs 60.

In this embodiment of units 10c, as in FIGS. 2 and 3, the upper part 54 of the brace 28 is shown welded at 42 to the respective post 26; and a transverse bar 44 (with fittings 46–48) interconnects the post 26 of each set.

In the embodiment of support units 10 shown by the units 10d of FIGS. 9–11, each support unit 10d is shown as having a pair of upright mounting base means 16d; and there are provided connection means 70, detailed below, for rigidly connecting each of the mounting base means 16d to the truck bed 12, each respective mounting base 16d being shown adjacent a side of the truck bed.

Similarly to the embodiments 10a–10c, there are shown a pair of upright support column means 26d, each of which is releasably connected to and supported by one of the mounting base means 16d.

The connection of each of the mounting base means 16d, as in the other embodiments, provides that each of the mounting bases 16d provides a rigid mounting means, which itself is permanently affixable to the truck bed 12, and which provides sturdy support for the respective support column 26d independent of any connection of the support column 26d itself to the truck bed.

More particularly as shown in FIGS. 9–11, the connection means 70 includes vertically-spaced sets of connection means, one of which connection means is a lower connection means 72 located at or adjacent the bottom portion 74 of the mounting base means 16d, and connecting to the bed-floor 75, and another of which connection means is an upper connection means 76 located in a position elevated lower connection 72, and connects the upper portion 78 of the mounting base means 16d to a side panel 80 of the truck bed 12.

Each of the connection means 70 (i.e., 72 and 76) is shown as an ear welded as at 82 to the mounting base 16d. For connection of the mounting base 16d along a side panel 80 of the truck bed, the ears (72, 76) are shown positioned fore-and-aft; and for connection of the mounting base 16d adjacent the intersection of the truck bed's side panel 80 and its front or end panel 83, the upper ear 76 is shown extending in a transverse direction.

As shown in FIGS. 10 and 11, the mounting base means 16d comprises a sleeve-like member which telescopingly receives the lower portion of the respective support column means 26d, the base 16d desirably being of U-shape or square in cross-section.

The upright columns 26d of FIGS. 9–11 are shown as interconnected by a transverse bar 84; and thus each support unit 10d includes two uprights 26d and a transverse bar 84, that assembly being removably supported onto the truck bed 12 by the permanently installed base units 16d whose ears (72, 76) are shown held by screws or bolts 86 to the truck panels.

Desirably (FIGS. 1 and 8), a connector lug or stud 66 is mounted, as by welding, to the transverse bar 44 at outward locations therealong, each with a convenient attachment hole 68; and these provide convenient places for tie-on straps or the like. In a desired embodiment, the lugs 66 on two sets of units 10 are spaced to receive sheets of plywood, of a conventional size of four feet by eight feet.

As for other desirable particulars, an assembled support unit or rack 10 has dimensions of approximately 12 inch width, 38 inch height, and from 55–57 inches in length. The special assembly and dis-assembly concepts allow for easy and convenient dis-assembly, and for storing and/or shipping in a compact carton only 12 inches by 8 inches by 58 inches. Rolled steel or aluminum are desirable materials; and if steel, the components are of course desirably galvanized or painted, and even chrome-plating may be used for greater attractiveness.

It is thus seen that a truck bed support frame unit, particularly in sets of two or more, provides a desirable and sturdy supporting framework when made according to the inventive concepts, and provides desired and advantageous improvements for such an overall framework for a truck bed, providing as much or more object-supporting benefits and effects than trucks with stake pockets and stakes.

Accordingly, it will thus be seen from the foregoing description of the invention according to these illustrative embodiments, considered with the accompanying drawings, that the present invention provides new and useful concepts of novel and advantageous truck bed object-support framing, easily mountable initially onto the truck, and thereafter easily erectable or removable with no need to reach under the truck bed, not at all unattractive, not bothersome to other uses of the truck, and in general providing utility from various standpoints such as pointed out herein, yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiments or form or arrangement of parts herein described or shown.

For example, although to illustrate the co-operating inventive concepts the drawings show specific embodiments, the various concepts of one embodiment are usable in other embodiments, and are thus not restricted to a specific embodiment in which they are shown. Also, for example, support units 10 of differing embodiments may if desirable be used for the overall framework for a particular truck. Thus, for example, the unit 10c or 10d may be used adjacent the forward end of the truck bed 12, with the braces 28 extending rearwardly or forwardly of the posts 26, and a support unit 10a adjacent the rear of the truck bed. Further, it being noted that no invention is here asserted to the formation of the associated truck or truck bed, such words as "truck" and "truck bed" are herein used in their general sense, and likewise, the phrase "truck bed" generally includes the side, front, and end panels with which the truck is provided, as well as the bed floor.

What is claimed is:

1. A support unit for a support frame means for an open-bed truck or van, such as for providing for the carrying of objects in a supported manner above the truck bed even though the truck may not be provided with stake pockets for supporting stake members which facilitate the elevated carry of such objects, the support frame means comprising one or more support units depending upon the amount and/or length of fore-and-aft support is desired, each support unit comprising:
- a pair of mounting base means;
- first connection means, for rigidly connecting each of the mounting base means to the truck bed, each respective one thereof adjacent a side of the truck bed;
- a pair of support column means;
- a pair of brace means;
- second connection means, for rigidly connecting an associated one of the support column means and brace means to a respective one of the mounting base means;
- third connection means for rigidly interconnecting one of the brace means to a respective one of the support column means at a position above its bottom;
- fourth connection means, for rigidly interconnecting the two support column means at a high elevation thereof;
- the said associated ones of the first connection means, the second connection means, and the third connection means, and the associated one of the brace means, co-operating to provide fore-and-aft stability to the support unit, the brace means extending in a generally fore-and-aft direction when assembled onto the mounting base means and the mounting base means is installed onto the truck bed;
- and the said associated ones of each set of the first connection means, the second connection means, and the fourth connection means and the associated support column means co-operating to provide transverse stability to the support unit,
- in a combination in which the portion of the second connection means which interconnects the support column means with the mounting base means includes a lug means upstanding from the mounting base means, and the adjacent portion of the support column means is a hollow tubular component which supportingly receives the lug means.

2. The invention as set forth in claim 1 in which the fourth connection means includes a rigid frame bar operatively extending between the two support column means.

3. The invention as set forth in claim 2 in which the fourth connection means also includes a telescoping joint connection of each end of the rigid frame bar with a respective one of the support column means.

4. A support unit for a support frame means for an open-bed truck or van, such as for providing for the carrying of objects in a supported manner above the truck bed even though the truck may not be provided with stake pockets for supporting stake members which facilitate the elevated carry of such objects, the support frame means comprising one or more support units depending upon the amount and/or length of fore-and-aft support is desired, each support unit comprising:
- a pair of mounting base means;
- first connection means, for rigidly connecting each of the mounting base means to the truck bed, each respective one thereof adjacent a side of the truck bed;
- a pair of support column means;
- a pair of brace means;
- second connection means, for rigidly connecting an associated one of the support column means and brace means to a respective one of the mounting base means;
- third connection means for rigidly interconnecting one of the brace means to a respective one of the support column means at a position above its bottom;
- fourth connection means, for rigidly interconnecting the two support column means at a high elevation thereof;
- the said associated ones of the first connection means, the second connection means, and the third connection means, and the associated one of the brace means, co-operating to provide fore-and-aft stability to the support unit, the brace means extending in a generally fore-and-aft direction when assembled onto the mounting base means and the mounting base means is installed onto the truck bed;
- and the said associated ones of each set of the first connection means, the second connection means, and the fourth connection means and the associated support column means co-operating to provide transverse stability to the support unit,
- in a combination in which the portion of the second connection means which interconnects the brace means with the mounting base means includes a lug means upstanding from the mounting base means, and the adjacent portion of the brace means is a hollow tubular component which supportingly receives the lug means.

5. The invention as set forth in claim 4 in which the fourth connection means includes a rigid frame bar operatively extending between the two support column means.

6. The invention as set forth in claim 5 in which the fourth connection means also includes a telescoping joint connection of each end of the rigid frame bar with a respective one of the support column means.

7. A support unit for a support frame means for an open-bed truck or van, such as for providing for the carrying of objects in a supported manner above the truck bed even though the truck may not be provided with stake pockets for supporting stake members which facilitate the elevated carry of such objects, the support frame means comprising one or more support units depending upon the amount and/or length of fore-and-aft support is desired, each support unit comprising:
- a pair of mounting base means;
- first connection means, for rigidly connecting each of the mounting base means to the truck bed, each respective one thereof adjacent a side of the truck bed;
- a pair of support column means;
- a pair of brace means;
- second connection means, for rigidly connecting an associated one of the support column means and brace means to a respective one of the mounting base means;
- third connection means for rigidly interconnecting one of the brace means to a respective one of the support column means at a position above its bottom;
- fourth connection means, for rigidly interconnecting the two support column means at a high elevation thereof;

the said associated ones of the first connection means, the second connection means, and the third connection means, and the associated one of the brace means, co-operating to provide fore-and-aft stability to the support unit, the brace means extending in a generally fore-and-aft direction when assembled onto the mounting base means and the mounting base means is installed onto the truck bed;

and the said associated ones of each set of the first connection means, the second connection means, and the fourth connection means and the associated support column means co-operating to provide transverse stability to the support unit, in a combination in which the portion of the second connection means which interconnects each of the support column means and the brace means with the mounting base means includes a lug means upstanding from the mounting base means, and the adjacent portion of each of the support column means and the brace means is a hollow tubular component which supportingly receives the lug means.

8. The invention as set forth in claim 7 in which the fourth connection means includes a rigid frame bar operatively extending between the two support column means.

9. The invention as set forth in claim 8 in which the fourth connection means also includes a telescoping joint connection of each end of the rigid frame bar with a respective one of the support column means.

* * * * *